(12) United States Patent
Davidson et al.

(10) Patent No.: US 8,576,228 B2
(45) Date of Patent: Nov. 5, 2013

(54) COMPOSITE TRANSITION NODES FOR USE IN 3D DATA GENERATION

(75) Inventors: Alan Davidson, Sherman Oaks, CA (US); Robert B. Engle, Encino, CA (US); Layne Friedman, Los Angeles, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 1033 days.

(21) Appl. No.: 12/357,391

(22) Filed: Jan. 21, 2009

(65) Prior Publication Data

US 2009/0289941 A1 Nov. 26, 2009

Related U.S. Application Data

(60) Provisional application No. 61/022,211, filed on Jan. 18, 2008.

(51) Int. Cl.
*G06T 15/10* (2011.01)
*G06T 15/20* (2011.01)
*G06T 15/00* (2011.01)
*G06K 9/00* (2006.01)

(52) U.S. Cl.
USPC ............................ 345/427; 345/419; 382/154

(58) Field of Classification Search
USPC .................................. 345/427, 419; 382/154
See application file for complete search history.

(56) References Cited

U.S. PATENT DOCUMENTS

| | | |
|---|---|---|
| 4,881,067 A | 11/1989 | Watanabe et al. |
| 5,440,682 A | 8/1995 | Deering |
| 5,818,959 A | 10/1998 | Webb et al. |
| 5,905,568 A | 5/1999 | McDowell et al. |
| 6,208,348 B1 | 3/2001 | Kaye |
| 6,215,500 B1 | 4/2001 | Deering |
| 6,515,659 B1 | 2/2003 | Kaye et al. |
| 6,525,722 B1 | 2/2003 | Deering |
| 6,563,504 B1 | 5/2003 | Rose et al. |
| 6,574,361 B1 | 6/2003 | Kawakami et al. |
| 6,686,926 B1 | 2/2004 | Kaye |

(Continued)

OTHER PUBLICATIONS

Engle; "Beowulf 3D: A Case Study"; Stereoscopic Displays and Applications XIX; Feb. 29, 2008; Proceedings of the SPIE; vol. 6803, pp. 68030R-68030R-9 (2008); SPIE—The International Society of Optical Engineering.

(Continued)

*Primary Examiner* — David T Welch
(74) *Attorney, Agent, or Firm* — Fitch, Even, Tabin & Flannery, LLP

(57) ABSTRACT

Several embodiments provide methods and apparatuses for use with node-based compositing to assist in the generation of a second eye or camera of a stereoscopic image. In one implementation, a method for use in 3D movie production comprises the steps: displaying composite nodes to a user, the composite nodes indicating how to composite a first plurality of rendered 2D elements into an output image, the rendered 2D elements and the plurality of composite nodes corresponding to a first eye of a 3D image; and receiving user input to add one or more transition nodes to the composite nodes, each transition node following a respective composite node and to be used for regeneration of one or more elements corresponding to the respective composite node, wherein the composite nodes and the one or more transition nodes are to be used to direct generation of a second eye of the 3D image.

27 Claims, 12 Drawing Sheets

(56) References Cited

U.S. PATENT DOCUMENTS

| | | |
|---|---|---|
| 7,007,295 B1 | 2/2006 | Rose et al. |
| 7,102,633 B2 | 9/2006 | Kaye et al. |
| 7,116,323 B2 | 10/2006 | Kaye et al. |
| 7,116,324 B2 | 10/2006 | Kaye et al. |
| 7,292,250 B2 | 11/2007 | Sepulveda |
| 7,545,974 B2 | 6/2009 | Jeong et al. |
| 7,567,252 B2 | 7/2009 | Buck et al. |
| 8,199,156 B2 | 6/2012 | Antoine |
| 8,243,123 B1 | 8/2012 | Geshwind et al. |
| 2004/0153824 A1 | 8/2004 | Devarajan et al. |
| 2004/0247176 A1 | 12/2004 | Aucsmith et al. |
| 2005/0062739 A1 | 3/2005 | Balmelli et al. |
| 2005/0063596 A1 | 3/2005 | Yomdin et al. |
| 2005/0117215 A1* | 6/2005 | Lange ............ 359/462 |
| 2006/0242550 A1* | 10/2006 | Rahman et al. ........ 715/500.1 |
| 2007/0143979 A1 | 6/2007 | Townsend et al. |
| 2007/0279412 A1 | 12/2007 | Davidson et al. |
| 2007/0279415 A1 | 12/2007 | Sullivan et al. |
| 2008/0018647 A1 | 1/2008 | Bunnell |
| 2008/0059578 A1 | 3/2008 | Albertson et al. |
| 2008/0066023 A1 | 3/2008 | Xu et al. |
| 2008/0170118 A1 | 7/2008 | Albertson et al. |
| 2008/0304705 A1 | 12/2008 | Pomerleau et al. |
| 2009/0041368 A1 | 2/2009 | Leberl et al. |
| 2009/0213034 A1 | 8/2009 | Wu et al. |
| 2009/0262108 A1 | 10/2009 | Davidson et al. |
| 2009/0262184 A1 | 10/2009 | Engle et al. |
| 2010/0277568 A1 | 11/2010 | Yun et al. |
| 2010/0290697 A1 | 11/2010 | Benitez et al. |
| 2011/0050853 A1 | 3/2011 | Zhang et al. |
| 2011/0257776 A1 | 10/2011 | Townsend et al. |

OTHER PUBLICATIONS

USPTO; U.S. Appl. No. 12/357,386; Office Action mailed Dec. 21, 2011.
USPTO; U.S. Appl. No. 12/357,389; Office Action mailed Nov. 8, 2011.
USPTO; Final Office Action issued in U.S. Appl. No. 121357,389, mailed Apr. 16, 2012, 22 pages.
USPTO; Final Office Action issued in U.S. Appl. No. 121357,386, mailed May 2, 2012, 15 pages.
USPTO; Office Action issued in U.S. Appl. No. 12/357,386, mailed Aug. 28, 2012, 13 pages.
USPTO; Notice of Allowance issued in U.S. Appl. No. 12/357,386, mailed Jan. 14, 2013, 8 pages.

* cited by examiner

COMPOSITE TRANSITION NODES FOR USE IN 3D DATA GENERATION

This application claims the benefit of U.S. Provisional Application No. 61/022,211, filed Jan. 18, 2008, entitled 3D MOVIE PRODUCTION, which is incorporated in its entirety herein by reference.

BACKGROUND OF THE INVENTION

1. Field of the Invention

The present invention relates generally to 3D image production for stereoscopic motion pictures, and more specifically to the rendering and compositing stages in computer generated 3D image production.

2. Discussion of the Related Art

Computer generated imagery (CGI) is becoming more common for use in the production of stereoscopic motion pictures. Typically, large quantities of 3D computer models are rendered by render farms to produce two sets of 2D images, each set representing one of the stereo cameras required for stereoscopic viewing. These 2D images are then composited, for example, using a node based compositing tool to provide two final composited 2D images for each frame of the stereoscopic motion picture. The composited 2D images are then color corrected, further processed and edited for final production. Various techniques exist to project the final two cameras to the user such that the user visually interprets the illusion of depth.

SUMMARY OF THE INVENTION

Several embodiments provide methods and apparatuses for use with a node-based compositing application useful in the generation of a second eye or camera of a stereoscopic image.

In one embodiment, the invention can be characterized as a method for use in 3D movie production, and a corresponding means performing the method, the method comprising the steps: displaying a plurality of composite nodes to a user, the plurality of composite nodes indicating how to composite a first plurality of rendered 2D elements into an output image, the first plurality of rendered 2D elements and the plurality of composite nodes corresponding to a first eye of a 3D image; and receiving user input to add one or more transition nodes to the plurality of composite nodes, each transition node following a respective composite node and to be used for regeneration of one or more elements corresponding to the respective composite node, wherein the plurality of composite nodes and the one or more transition nodes are to be used to direct generation of a second eye of the 3D image.

In another embodiment, the invention can be characterized as a storage medium storing a computer program executable by a processor based system, the computer program causing the processor based system to execute steps comprising: displaying a plurality of composite nodes to a user, the plurality of composite nodes indicating how to composite a first plurality of rendered 2D elements into an output image, the first plurality of rendered 2D elements and the composite node graph corresponding a first eye of a 3D image; and receiving user input to add one or more transition nodes to the plurality of composite nodes, each transition node following a respective composite node and to be used for regeneration of one or more elements corresponding to the respective composite node, wherein the plurality of composite nodes and the one or more transition nodes are used to be used to direct generation of a second eye of the 3D image.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
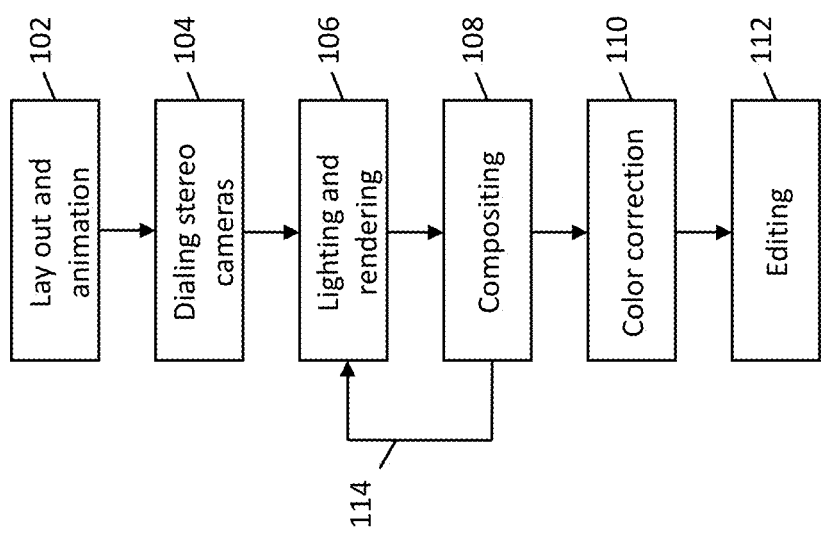
FIG. 1 is a simplified block diagram of a portion of a production pipeline for a 3D movie in accordance with one embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

In accordance with several embodiments, while transition nodes are added to a compositing node graph generated during compositing of a first eye of a stereo image. These transition nodes are useful in the regeneration, e.g., through re-rendering or re-projection, of elements of the first eye to create the second eye. In this way, according to several embodiments, the compositing node graph is used in novel ways to assist in the rendering stage of a production pipeline. The composite node graph with transitions is also used in some embodiments to composite the 2D images of the second eye.

Referring first to FIG. 1, a simplified block diagram is shown of a portion of a production pipeline for a 3D movie in accordance with one embodiment. It is understood that this is merely one example of a portion of a production pipeline and that many common functional block are not shown.

In one embodiment, the layout and animation stage 102 provides digital data corresponding to a 2D image data representing a 2D movie. The digital data may represent live action movie footage and/or computer generated (CG) image data. The dialing stereo cameras stage 104 provides stereo cameras that will be used to generate the 3D movie. It is well understood that in order to create the illusion of 3D to a viewer, two cameras (also referred to as eyes) are needed. Often, the two cameras are referred to as the left eye and the right eye. In the event the digital data is live action, the stereo cameras will come from footage shot from two different physical cameras. In the event the digital data is computer generated to be used alone or together with live action footage, the stereo cameras for the computer generated data are generated from 3D models using well known 3D modeling programs such as the Autodesk® Maya® product. The dialing stereo cameras stage 104 adjusts the stereo cameras to create the desired illusion of depth for the user. The lighting and rendering stage 106 applies color, texture, lighting, etc. to the images of the stereo cameras. The lighting and rendering stage 106 also provides rendering to convert 3D wireframe models of the stereo cameras into 2D images or 2D elements. Rendering is a computationally expensive and time consuming process and is often performed by a render farm, which is a computer cluster built specifically to render computer generated imagery (CGI). Typically, rendering provides many 2D elements for each camera that will need to be composited by a compositing application into final 2D images by the compositing stage 108. Next, the composited 2D images for the stereo cameras are then color corrected along with other post processing or production techniques in the color correction stage 110, then edited in the editing stage 112 during production to produce the final stereo 2D images. One of several well known projection techniques is used to display the final 2D images to create the illusion of depth for viewers. Such techniques include the use of LCD shutter glasses, linearly polarized glasses, and circularly polarized glasses, for example.

Figure 2:
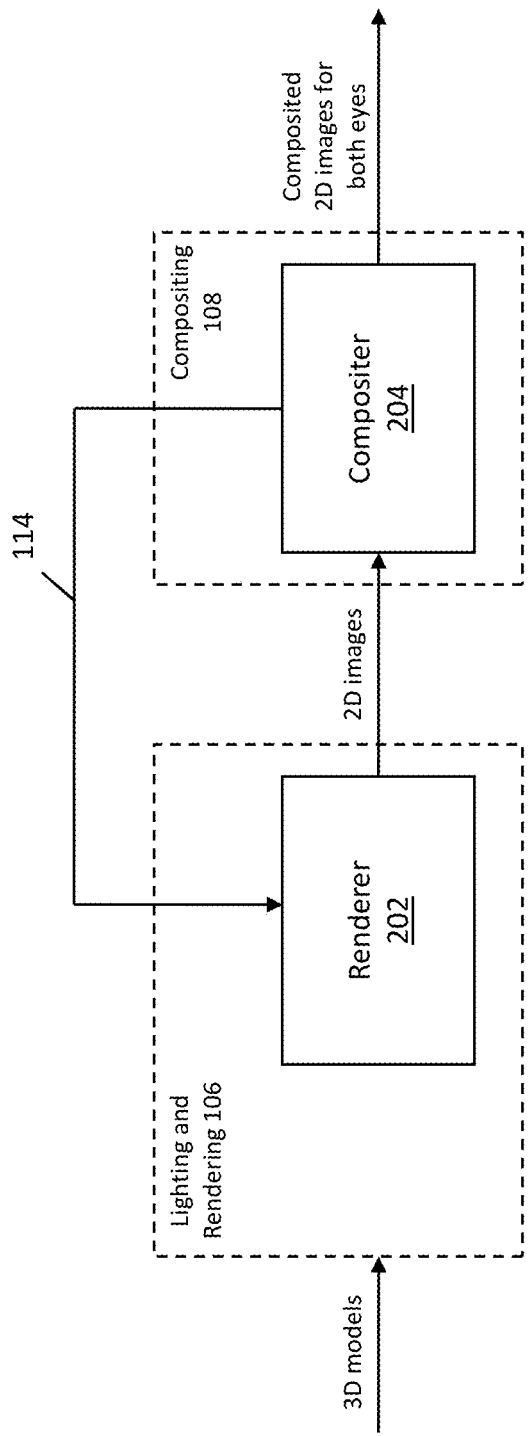
FIG. 2 is a functional block diagram of a renderer and a compositer of a 3D movie production pipeline in accordance with one embodiment.

In some embodiments and contrary to known pipelines, the compositing stage 108 provides an output or feedback to the lighting and rendering stage 106 to greatly reduce the time needed and the amount of rendering needed in the rendering process. This is represented in the diagram of FIG. 1 are feedback 114. This feedback is described in more detail while also referring to FIG. 2. FIG. 2 provides a functional block diagram of a renderer 202 of the lighting and rendering stage 106 and a compositer 204 of the compositing stage 108 in accordance with one embodiment.

Accordingly, in some embodiments, during the lighting and rendering stage 106, only the 3D models for one camera or eye of the stereo cameras is rendered by the renderer 202. The rendered 2D elements or images for the first eye are then used in the compositing stage 108 by the compositer 204 to generate a composite node graph to composite the rendered 2D images into a final composited 2D image corresponding to the first eye. As is well known in a node-based compositing applications, the composite node graph is a node-by-node tree or graph indicating to the compositing application exactly how to composite the rendered 2D elements into a composite 2D image. The composite node graph may indicate which order the compositer 204 should use the rendered 2D images and also which effects to apply to the rendered 2D images.

In accordance with several embodiments, the compositer 204 allows a user or shot finishing artist to add transition nodes into the composite node graph. Each transition node typically follows a given composite node (and thus, corresponds to the given composite node) in the node graph and is useful in rendering the elements of the second eye of the stereo image. In one way, the transitions may be described as markers in the node stream. For example, in one embodiment, the transition node provides instructions for how to regenerate the element or effect dictated by the composite node or nodes the transition node corresponds to. In one embodiment, the method of re-generating the element or effect from the first eye to generate the second eye includes one or more of the following re-generation methods explained more fully herein: re-rendering, re-projecting, image warping, offsetting, transforming, and passthrough. Instructions indicating which elements are to be re-rendered are provided to the renderer 202 application, which then renders the elements of the second eye in accordance with the instructions. Thus, in one embodiment, the renderer 202 only renders the first eye and waits for the instructions from the user via the compositer 204 before rendering the elements of the second eye. As can be seen by the re-generation options, there are instances where the user can assign that a given element does not need to be rendered for the second eye. In many cases, the compositer (or associated plug-in or application) will perform the specific type of regeneration, such as offset, transform, image warp or passthrough the element. In some embodiments, where an element is to be re-projected, the re-projection is performed by the rendering application. For example, the rendering application will re-model the scene through re-projection without actually rendering the element.

The addition of transition nodes to the composite node graph of the first eye to generate the second eye also saves an artist considerable time in that the artist or user does not have to create a second composite node graph from scratch for the second eye. Essentially, the artist re-uses the composite node graph for the first eye but includes transition nodes. In this way and in some embodiments, once the transitions are in place, the process of rendering and compositing the elements of the second eye is automated. That is, the user triggers the automatic loading of elements to the render queue for rendering. Thus, in some embodiments, the amount of user time during the rendering and compositing is reduced from days to hours.

Figure 9:
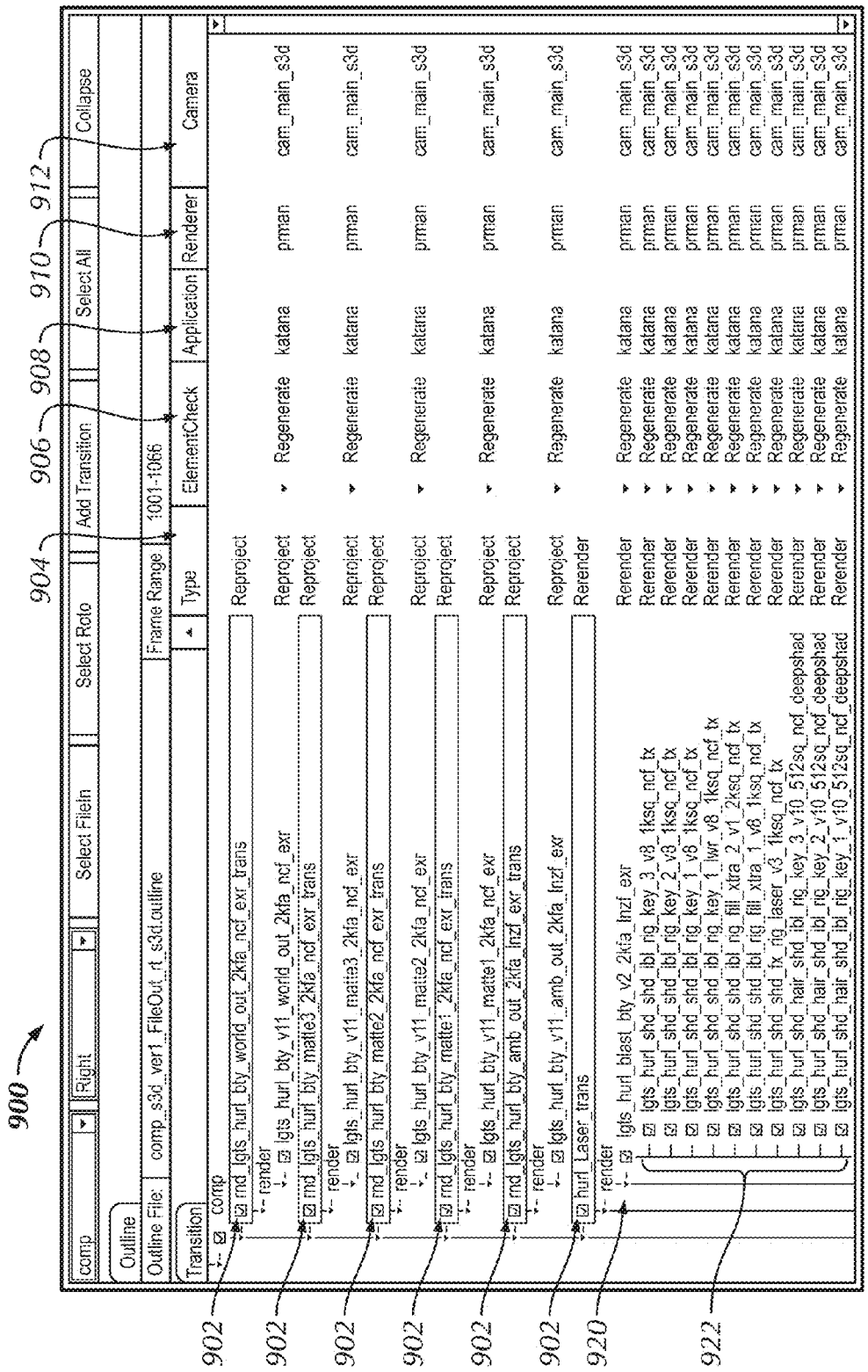
FIG. 9 is an exemplary portion of a graphical user interface that provides an outline listing of composite nodes and transition nodes in accordance with one embodiment.
Figure 10:
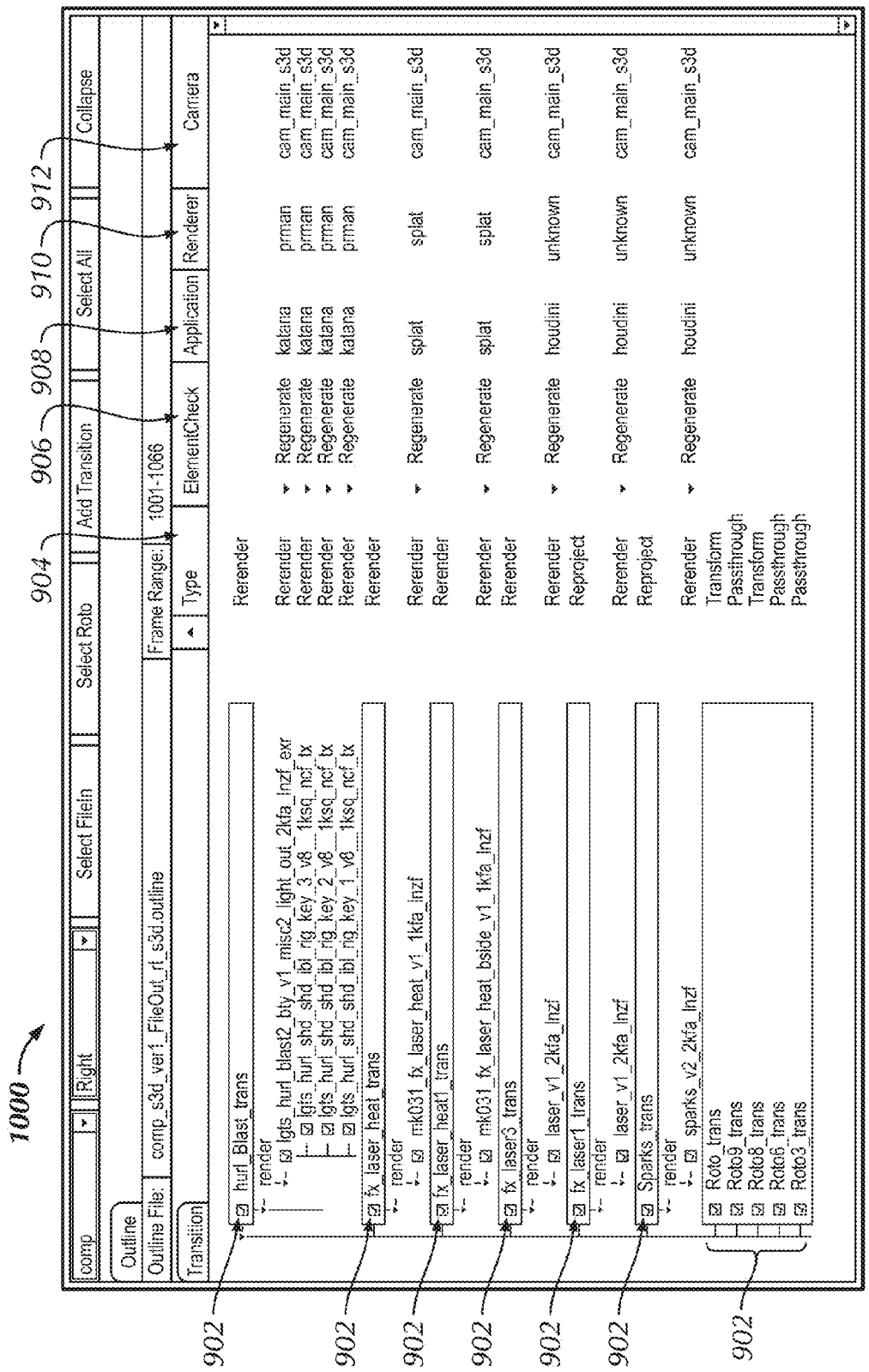
FIG. 10 is another exemplary portion of the graphical user interface of FIG. 9 in accordance with one embodiment.
Figure 11:
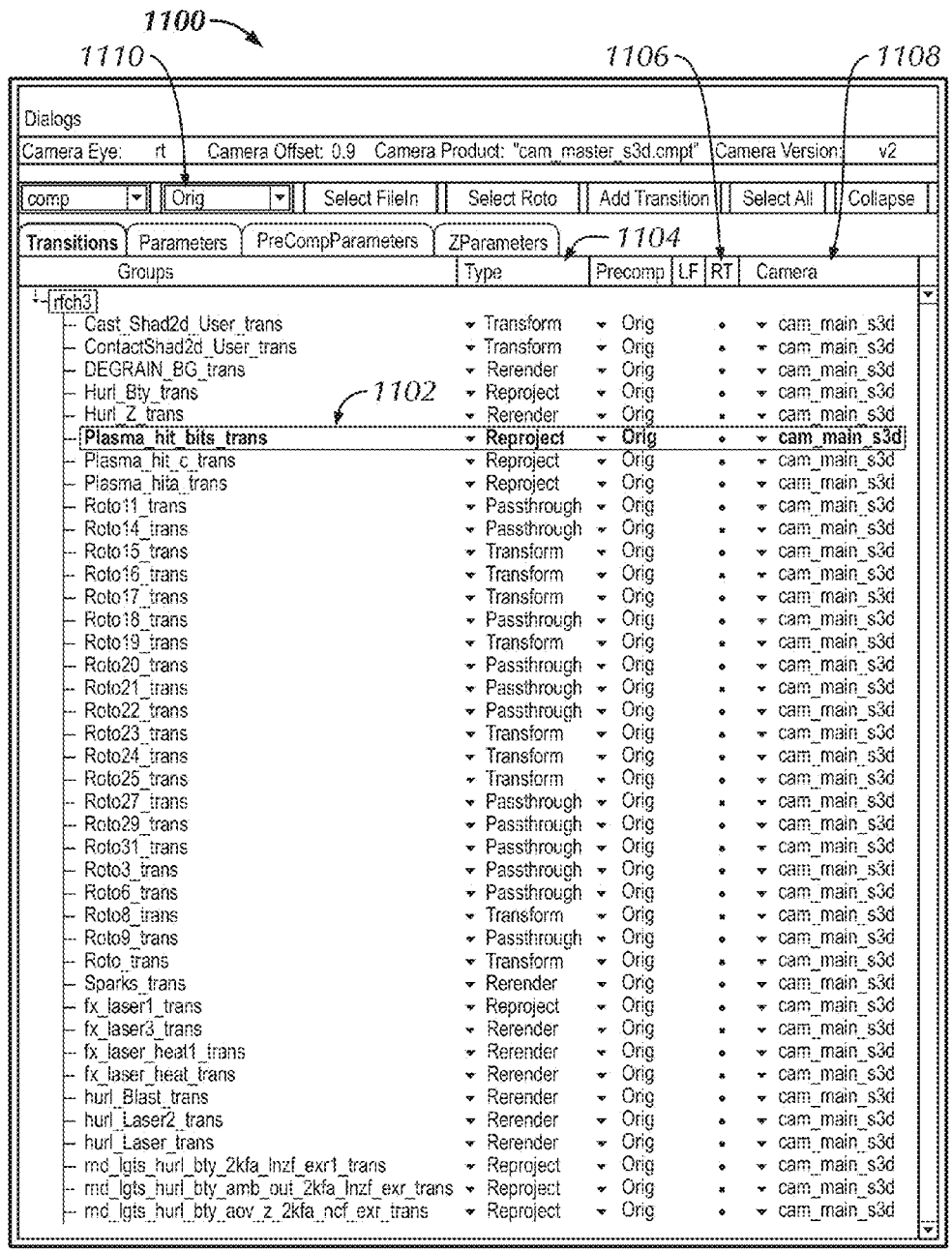
FIG. 11 is an exemplary portion of a graphical user interface that provides a transition editor in accordance with one embodiment.

In some further embodiments, the compositer 204 provides a user interface to assist in the addition and management of the transition nodes, resulting in less time required by an artist to set up the compositing process and the rendering and compositing of the second eye. FIGS. 9-11 provide examples of such a user interface. This will allow for the artist to spend more time on the artistic side of the shot finishing process.

It is noted that in some embodiments, the renderer 202 is a software application being executed by a processor based computer system to provide the rendering function. In one embodiment, the renderer 202 implements Pixar's RenderMan® product. It is also understood that the renderer 202 may be a render farm and may utilize a render queue where data is temporarily held in line to be rendered. Further, in many embodiments, the compositer 204 is also a software application being executed by a processor based computer system to provide the compositing function. In one embodiment, the compositer 204 is a compositing program and may be a commercially available product or a custom developed compositing software package.

It is also noted that while the functionality of the renderer 202 and the compositer 204 are illustrated as separate functional components, in some embodiments, the rendering and compositing functions may be at least partially integrated. For example, the compositer 204 may be configured to perform rendering functionality for the second eye, or the compositing package may be configured to load data to the render queue for rendering. Thus, while FIG. 2 illustrates a separate renderer 202 and compositer 204 with separate feedback 114, it is understood that in some embodiments, these are functional representations and that these functions may be at least partially mixed or integrated.

Figure 3:
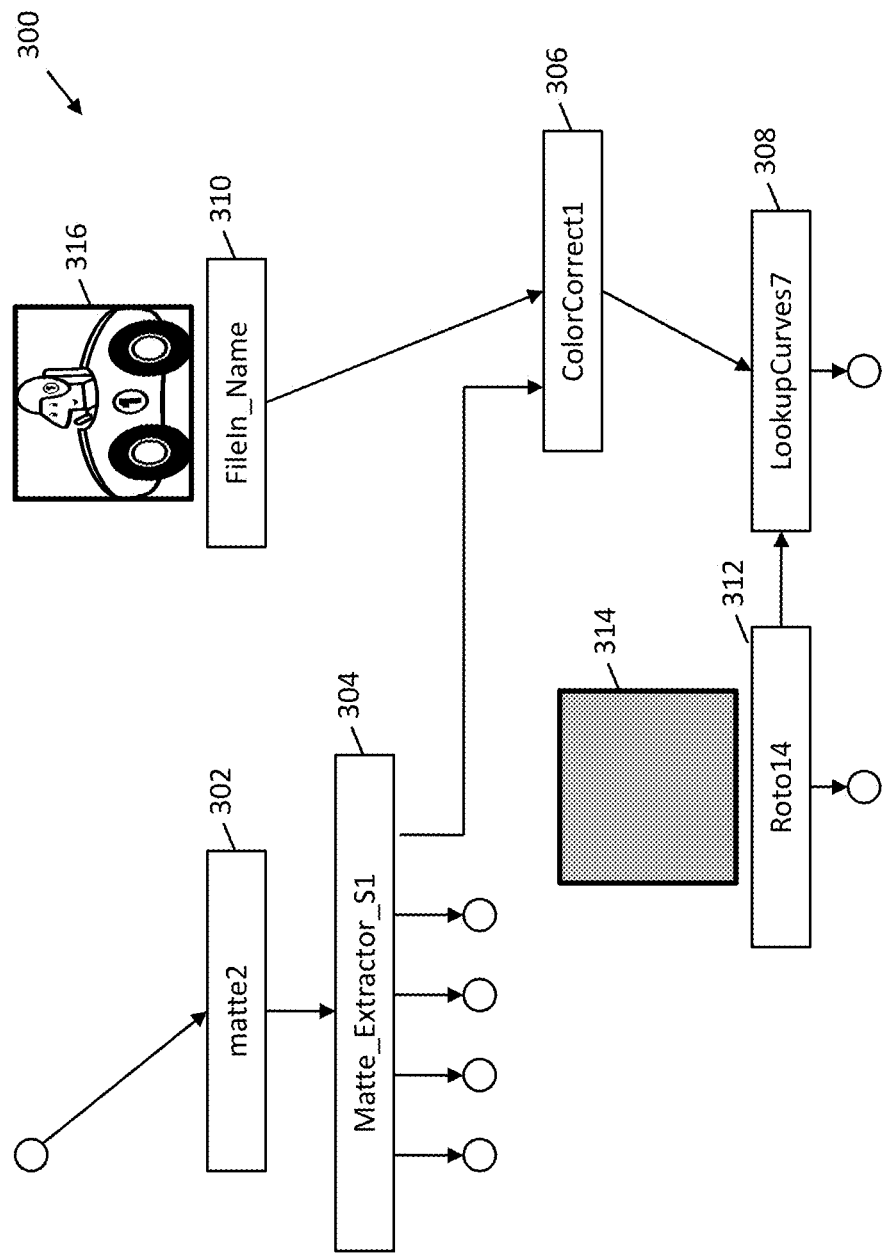
FIG. 3 is an exemplary portion of a composite node graph useful in the compositing of rendered 2D images representing a first eye of an image.

Referring next to FIG. 3, an exemplary portion of a composite node graph 300 is shown that is useful in the compositing of rendered 2D images representing a first eye of an image. In one embodiment, the portion of the node graph is displayed to a user via a computer display device in a graphical user interface. It is well understood that a composite node graph may include several hundred variously interconnected nodes and that FIG. 3 only illustrates a small portion of a typical composite node graph. Illustrated are branch nodes 302, 304, 306 and 308, FileIn node 310 and roto node 312. Small circles indicate connection points to other portions of the node graph that are not shown for clarity purposes. The FileIn node 310 is a composite node that imports an image. In this case, the FileIn node 310 imports image or element 316, which is a rendered 2D image or element for the first eye from the rendering process. To assist the artist in generating and reviewing the composite node graph, the graphical user interface of several embodiments displays a visual representation of the element 316 in proximity to the FileIn node 310. A FileIn node is also referred to as a leaf node since it is at a beginning end of the graph or tree. Branch nodes 302, 304, 306 and 308 each define a function to be performed in the compositing process. For example, branch node 302 applies a matte, node 304 extracts a matte, and node 306 provides color correction. Roto node 312 adds a curve or other effect generated by a visual effects application or plug-in. A visual representation of the effect 314 is displayed in proximity to the roto node 312. The roto node 312 does not provide an image from disc like the FileIn node 310 since it is not rendered through a lighting and rendering package. The branch node 308 indicates how to apply the roto node 312. As the compositer 204 goes through the composite node graph, the compositer will composite the rendered 2D elements of the first eye to create a final 2D image of the first eye.

Figure 4:
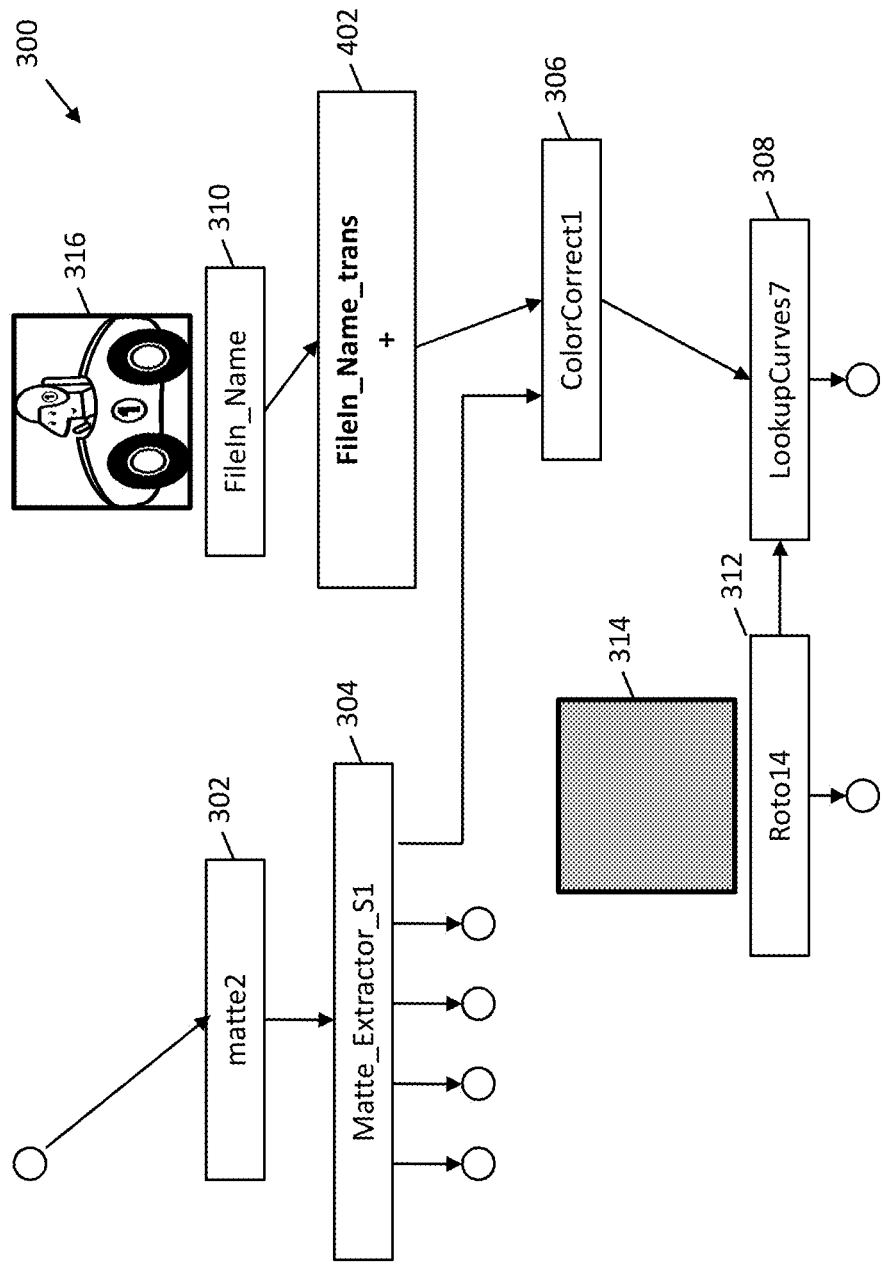
FIG. 4 is an exemplary portion of the composite node graph of FIG. 3 including a transition node following a FileIn node in accordance with several embodiments.

Referring next to FIG. 4, an exemplary portion of the composite node graph of FIG. 3 is shown including a transition node 402 following a FileIn node in accordance with several embodiments. In this embodiment, in order to regenerate the second eye, the artist adds transition node 402 to the composite node graph 300. The transition node 402 is placed in the node graph following the FileIn node 310 and preceding the branch node 306. The transition node 402 corresponds to the preceding upstream composite node, the FileIn node 310. In several embodiments, the user then assigns a method of regenerating the 2D element 316 for the second eye. As described above, the user can assign any one of a number of different regeneration techniques to create the second eye of the 2D element. In one embodiment, the available regeneration techniques include: re-rendering, re-projecting, image warping, offsetting, transforming, and passthrough. In this way, the user can select whether the user feels that the element needs to be re-rendered for the second eye or if one of several other regeneration techniques will provide adequate results. Ideally, the user would select re-rendering for the 2D element; however, rendering is a computationally expensive process. In the case of stereo motion pictures, some users may feel that the precision of re-rendering is not needed since it is difficult for the human eye to resolve this level of precision in a motion picture. The specific methods of regeneration are described in more detail below. Once the transition node 402 is added to the node graph 300, the user may open a transition editor to define how the 2D element is to be regenerated (e.g., see FIG. 11). If the 2D element is to be re-rendered for the second eye, the user can trigger the loading of the 2D element to the render queue for rendering.

Figure 5:
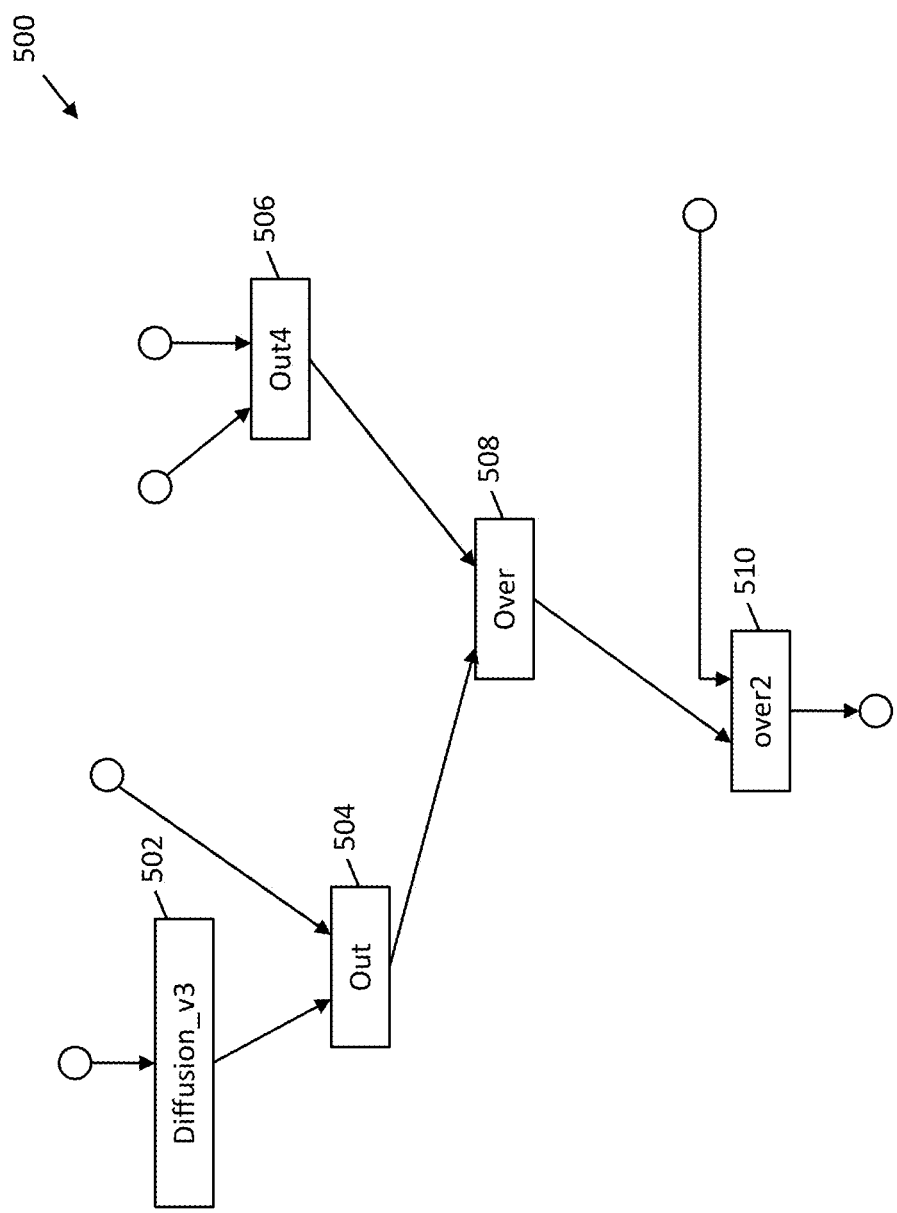
FIG. 5 is another exemplary portion of a composite node graph useful in the compositing of rendered 2D images representing a first eye of an image.

Referring next to FIG. 5, another exemplary portion of a composite node graph 500 useful in the compositing of rendered 2D images representing a first eye of an image is shown. Again, in one embodiment, the portion of the node graph is displayed to a user via a computer display device in a graphical user interface. It is also well understood that a composite node graph may include several hundred variously interconnected nodes and that FIG. 5 only illustrates a small portion of a typical composite node graph. Illustrated are branch nodes 502, 504, 506, 508 and 510. Small circles indicate connection points to other portions of the node graph that are not shown for clarity purposes. Branch nodes 502, 504, 506, 508 and 510 each define a function to be performed or effect to be applied in the compositing process.

Figure 6:
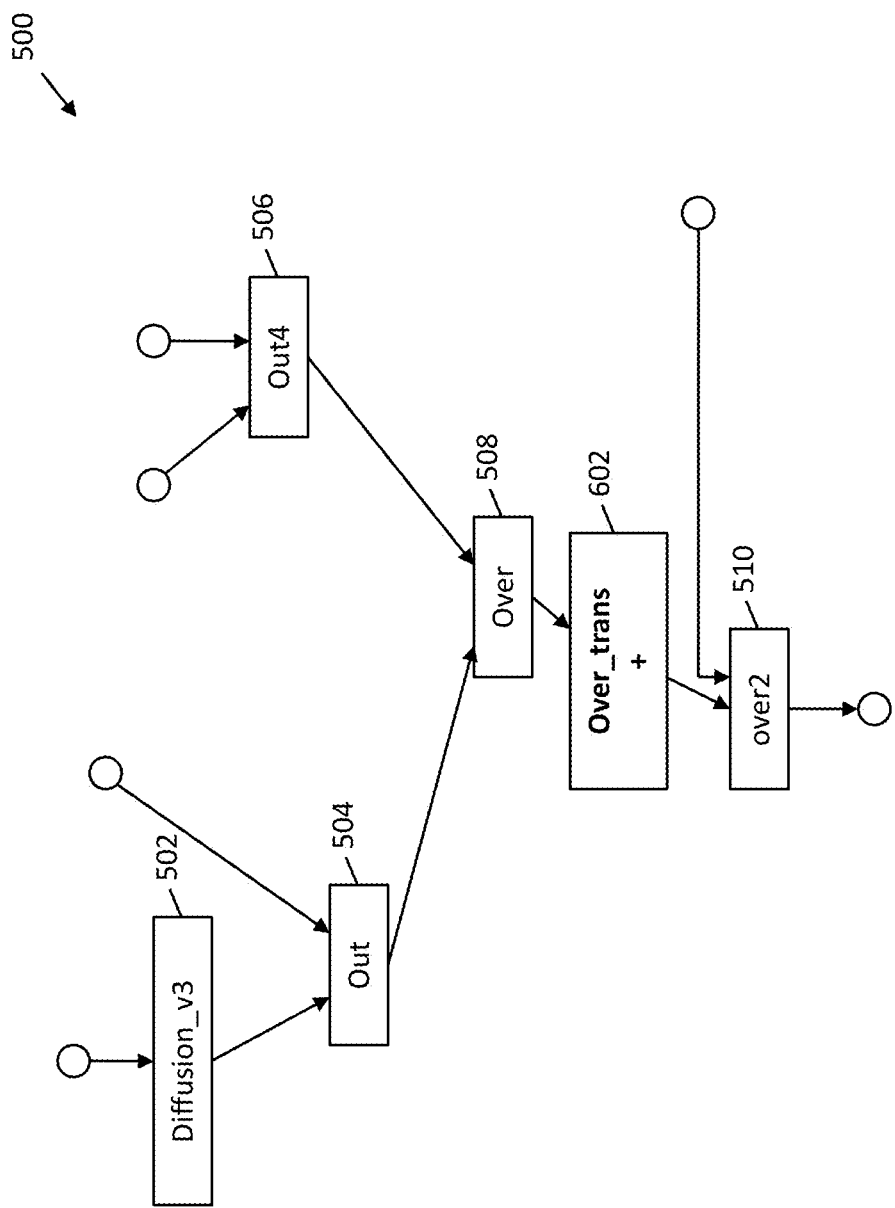
FIG. 6 is an exemplary portion of the composite node graph of FIG. 5 including a transition node following a branch node in accordance with several embodiments.

Referring next to FIG. 6, an exemplary portion of the composite node graph of FIG. 5 is shown that includes a transition node 602 following branch node 508 in accordance with several embodiments. The transition node 602 is added in order to assist in the generation of the second eye. In this embodiment, the artist determined that the transition node 602 was needed in the flow of the composite node graph immediately following branch node 508 in order to best regenerate the second eye. In this case, the branch node 508 immediately preceding the transition node 602 is not a FileIn node. Accordingly, the user can not assign re-rendering as a possible method of regenerating the element of branch node 508. Thus, while the user still can determine and assign a method of regeneration for the element of the branch node 508, re-rendering is not a possible option. This is due to the fact that the element of branch node 508 is not a 2D element that was rendered in the rendering stage. Instead, it is an element or visual effect added during the compositing stage, for example, using a visual effects application integrated with or used together with the compositing package, such as Adobe® Illustrator®. Accordingly, the user can assign any one of a number of different available regeneration techniques to create the second eye of the 2D element, excluding re-rendering. In one embodiment, the available regeneration techniques include: re-projecting, image warping, offsetting, transforming, and passthrough.

Relative to the node graph of FIGS. 3 and 4, the branch node 508 is also not a leaf node and; thus, has a dependency of compositing events as one walks up the composite node graph. In this case, in the event the user selects re-projection as the method of regenerating the element of the branch node 508, the user then determines if the user wants to re-project the effect or element of the node 508 only or if the user would like to re-project the entire branch moving upstream from the branch node 508. This decision is up to the user and will likely depend on why the user selected the transition node for the given location. When the user selects to re-project the entire upstream branch, this is referred to as a precomp re-projection. This process saves considerable time when compositing the second eye, since up to the point of branch node 508, the image is composited for the first eye and the transition node will then cause the re-projection of the composited image thus far to generate the second eye thus far.

Similar to that described above, once the transition node 602 is added to the node graph 500, the user may open a transition editor to define how the element of branch node 508 is to be regenerated. The composite graph portions of FIGS. 3-6 only illustrate very small sections of a composite node graph that would be used in a real life application when producing a 3D motion picture. For example, there may be hundreds of nodes, and many tens of transition nodes. Accordingly, several embodiments use compositing node graphs for other than intended conventionally purposes. That is, the transition nodes and the composite node graph are used to determine how to render the second eye of a 3D image. The composite node graph provides a convenient location to add transition nodes since all information needed to generate an output image is present in the composite node graph.

Figure 7:
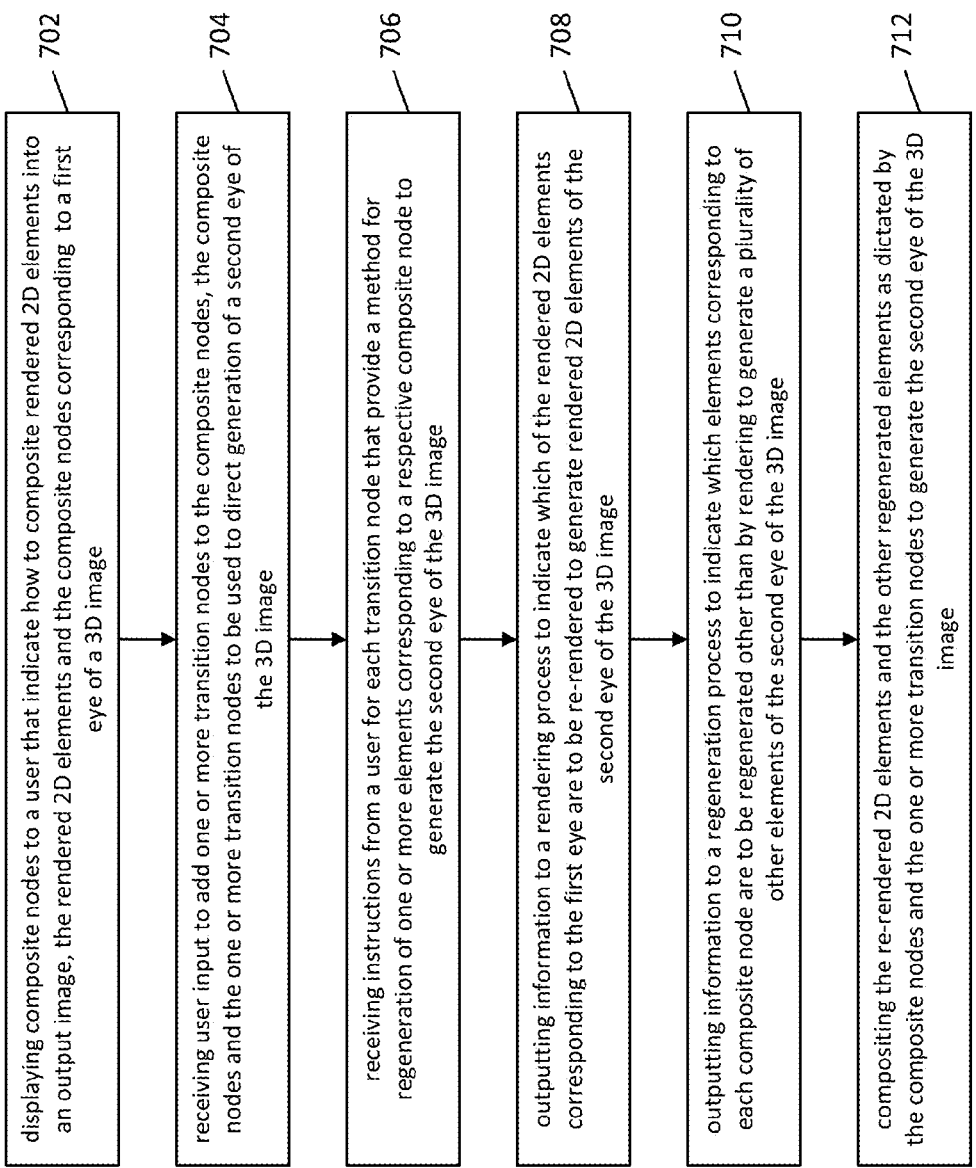
FIG. 7 is a flowchart illustrated the steps performed during the compositing stage in accordance with several embodiments.

Referring next to FIG. 7, a flowchart is shown that illustrates the steps performed during the compositing stage in accordance with several embodiments. In one embodiment, this method is performed by an application using a processor to execute program instructions stored on a computer readable medium when an artist or user runs the application. Initially, composite nodes that indicate how to composite rendered 2D elements into an output image are displayed to a user, where the rendered 2D elements and the composite nodes correspond to a first eye of a 3D image (Step 702). It is noted that the rendered 2D elements may be referred to as a first plurality of rendered 2D elements. In one form, the composite nodes are displayed in a graphical format as a composite node graph that indicates the graphical inter-relationship between nodes. In another form, the composite nodes are additionally or alternatively displayed as a listing of composite nodes where the listing indicates respective node dependencies or node inter-relationship. In one embodiment, the display is created by a computer based system driving a display device such a computer monitor viewable by a user. The portions of the composite node graphs of FIGS. 3-6 are examples of such display. Additionally, the displays of FIGS. 9-10 are examples of the display of a listing of composite nodes indicating node dependencies. From the perspective of the end user or artist, Step 702 may alternatively be described as viewing composite nodes indicating how to composite rendered 2D elements into an output image representing a first eye of a 3D image, the rendered 2D elements and the composite nodes corresponding to the first eye of the 3D image.

Next, user input to add one or more transition nodes to the composite nodes is received, the composite nodes and the one or more transition nodes to be used to direct generation of a second eye of the 3D image (Step 704). In one embodiment, each transition node follows a respective composite node and is to be used for directing the regeneration of one or more elements corresponding to the respective composite node. For example, referring to FIG. 4, user input is received to add transition node 402 in sequence after FileIn node 310. As described above, this transition node will be used in the regeneration of the rendered 2D image 316 as the second eye. In another example, referring to FIG. 6, user input is received to add transition node 602 in sequence after branch node 508. In one embodiment, the user manipulates a graphical user interface to provide the appropriate user input to add the transition. In another embodiment, the user manipulates a user interface comprising a listing to provide the appropriate user input. In one embodiment, the user provides the input via a keyboard and mouse or other user input device. Accordingly, in one embodiment, the facilitation of the user input and receipt of the user input is performed by a computer based system operating a user interface. From the perspective of the end user or artist, Step 704 may alternatively be described as adding one or more transition nodes to the composite nodes, wherein the composite nodes and the one or more transition nodes are to be used to generate a second eye of the 3D image.

Figure 8:
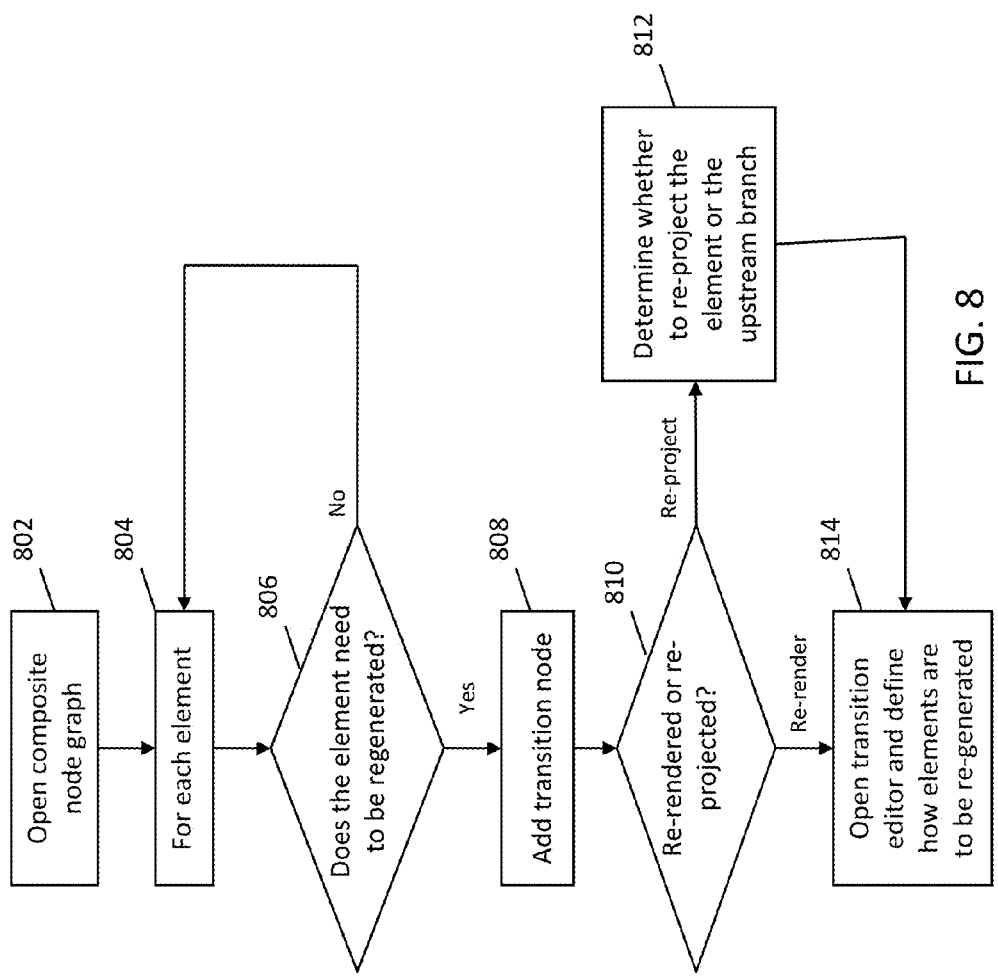
FIG. 8 is a flowchart illustrating the steps performed by a user in managing transitions in accordance with several embodiments.

Next, for each transition node, instructions are received from a user that provide a method for regeneration of one or more elements corresponding to a respective composite node to generate the second eye of the 3D image (Step 706). These instructions are stored in association with each transition node. Thus, in one embodiment, the user specifies to the compositing application how an element or elements (in the event a transition node follows a branch node) is to be regenerated in order to create the second eye. In one embodiment, the instruction provides that the element is to be re-rendered. In some embodiments, the method of regeneration may be selected from a plurality of regeneration methods. In one embodiment, the selectable regeneration methods including, but are not limited to two or more of: re-rendering, re-projecting, image warping, offsetting, transforming, and passthrough. Generally, re-rendering involves using re-rendering software or program code to render the element again for the second eye. Image warping, offsetting and transforming are well known methods of generating a 2D element performed in connection with a compositing program or associated application. Passthrough is a method that does nothing, i.e., no changes are made to the element of the first eye to create the element in the second eye. Re-projection as a method of regeneration is discussed in more detail herein. Additionally, the method of FIG. 8 provides details of how a user manages transition nodes. In one embodiment, the application receiving the instructions allows for the receipt of instructions via a user interface. For example, in one embodiment, once transition nodes are added, the user opens a transition editor user interface generated by the compositing application program code, one example of which is shown in FIG. 11. From the perspective of the end user or artist, Step 706 may alternatively be described as determining a method of regeneration to be used to regenerate one or more elements corresponding to a respective composite node preceding each transition node in order to generate the second eye of the 3D image and then inputting the method of regeneration for each transition via a user interface.

Next, information is output to a rendering process to indicate which of the rendered 2D elements corresponding to the first eye are to be re-rendered to generate rendered 2D elements of the second eye of the 3D image (Step 708). It is noted that the rendered 2D elements may be referred to as a second plurality of rendered 2D elements. By way of example, information from added transition nodes and user assigned regeneration methods is sent to the rendering application. In some embodiments, the compositing application controlling the method thus far also performs or controls part of the rendering process, at least with respect to the second eye. Accordingly, relative to the functional block diagram of FIG. 2, feedback is provided in the compositing stage that is used by the rendering stage to render the second eye. Thus, in one form, the system does not render 2D elements of the second eye until after receiving the information from the addition of transition nodes. By selecting the method of regeneration, not all elements of the second eye will need to be rendered. This reduces the amount of overall computational processing needed for rendering. From the perspective of the end user or artist, Step 708 may alternatively be described as causing information to be output to a rendering process, the information including which of the rendered 2D elements corresponding to the first eye are to be re-rendered to generate rendered 2D elements of the second eye.

Next, information is output to a regeneration process to indicate which elements corresponding to each composite node are to be regenerated other than by rendering to generate a plurality of other elements of the second eye of the 3D image (Step 710). That is, either because the element or elements corresponding to a composite node affected by a transition node can not be re-rendered or the user chooses not to re-render an element that could be re-rendered, information is provided that will be used to regenerate the second eye from the element or elements of the first eye. For example, an element may be re-projected, offset, transformed, or image warped. In some embodiments, in the case that the element is to be regenerated through re-projection, the regeneration process is performed by a rendering application. For example, the rendering application will re-model the scene through re-projection without actually rendering the element. In other cases, the regeneration process is performed by a separate application that is a part of compositing or an intermediate application between rendering and compositing. In some embodiments, where the regeneration is other than re-rendering and re-projection, the regeneration process is performed by the compositing application (or an associated plug-in or application), such as offset, transform, image warp or passthrough. From the perspective of the end user or artist, Step 710 may alternatively be described as causing information to be output to a regeneration process, the information including which elements corresponding to each composite node are to be regenerated other than by rendering to generate other elements of the second eye of the 3D image.

Next, re-rendered 2D elements and the other regenerated elements are composited as dictated by the composite nodes and the one or more transition nodes to generate the second eye of the 3D image (Step 712). In one embodiment, this is performed by the compositing application and results in the generation of final composited images for both eyes. From the perspective of the end user or artist, Step 712 may alternatively be described as causing compositing of the re-rendered 2D elements and the other regenerated elements as dictated by the composite nodes and the one or more transition nodes to generate the second eye of the 3D image.

Referring next to FIG. 8, a flowchart is shown that illustrates the steps performed by a user in managing transitions in accordance with several embodiments. First, the user opens a composite node graph that is used to composite a first eye (Step 802). Portions of an example composite node graph are illustrated in FIGS. 3-6. For each element (Step 804), the user determines whether the individual element needs to be re-generated for the second eye (Step 806). If not, then the user goes to the next element (Step 804) and repeats Step 806. If the individual element needs to be re-generated for the second eye, the user adds a transition node to the composite node graph or composite node listing (Step 808). As described above, in some embodiments, the transition node can be added after a FileIn node, a branch node or a roto node. Next, the user determines whether the user would like to re-render or re-project the element (Step 810). If the user wants to re-project the element, the user determines whether to re-project only the element or to re-project the whole upstream branch including the element of the corresponding composite node preceding the transition node (Step 812). In one embodiment, the re-projection is a whole branch is referred to a precomp re-projection. The user then opens a transition editor and defines how the element or branch is to be re-generated (Step 814). An example transition editor in the form of a user interface is illustrated in FIG. 11. In some embodiments, as described above, only a 2D element corresponding to a FileIn node can be re-rendered. However, a user can select to re-project a 2D element from the FileIn node if the user feels that it will be appropriate for the given element. In one embodiment, when defining how to regenerate a given element in Step 814, the user can select a method of regeneration of the following methods: re-rendering (for elements of FileIn nodes only), re-projecting, image warping, offsetting, transforming, and passthrough. This listing of regeneration methods is not required by all embodiments and may include less options or more options in other embodiments.

Referring next to FIG. 9, an exemplary portion of a graphical user interface is illustrated that provides an outline listing of composite nodes and transition nodes in accordance with one embodiment. The composite listing was generated from the composite node graph created by the user to composite the first eye. In the interface 900, composite nodes are illustrated in the listing together with the transition nodes 902 (the transition nodes illustrated as being highlighted in gray in FIG. 9). The listing indicates how the transition nodes depend on other composite nodes. Additionally, type column 904 indicates how the element is to be regenerated (e.g., re-render, re-project, transform, passthrough, etc.), element check column 906 indicates whether the element is to be regenerated, application column 908 indicates the compositing application, renderer column 910 indicates the rendering program used, and camera column 912 indicates what camera the element is currently assigned. In this interface, the user can add transitions by clicking "Add Transition". Additionally, the user can change the camera assigned to the element under the camera column 912. Camera column 912 provides a drop down menu of the available camera options. The composite listing provides all of the details for how to generate the second eye for a particular element. For example, in order to generate the second eye for the element corresponding to the transition node "hurl_Laser_trans", the system needs to produce rendered element 920, and in order to produce element 920, elements 922 need to be generated.

Referring next to FIG. 10, another exemplary portion of the graphical user interface of FIG. 9 is illustrated in accordance with one embodiment. In this portion 1000 of the interface, it can be seen that some elements may use different effects packages. For example, in order to render "fx_laser_heat_trans", Splat® is used for the rendering.

When referring to both FIGS. 9 and 10, in some embodiments, the user can use the listing of composite nodes to add transition nodes. In one embodiment, the user selects a given composite node and then clicks "Add Transition", and a transition is inserted following the selected composite node. In another embodiment, the user can select all Rotos by clicking "Select Roto" which will display all roto nodes. The user then selects a given roto node and clicks "Add Transition", and a transition is inserted following the selected roto node. In another embodiment, the user can select all FileIn nodes by clicking "Select FileIn" which will display all FileIn nodes. The user then selects a given FileIn node and clicks "Add Transition", and a transition is inserted following the selected FileIn node. As an alternative, the user may also select a given composite node in the graphical representation of the composite node graph and click to add a transition.

Referring next to FIG. 11, an exemplary portion of a graphical user interface is illustrated that provides an example transition editor listing all transition nodes in accordance with one embodiment. The transition editor interface 1100 provides for simple and fast management of all transition nodes. To define a particular regeneration method for a selected transition node 1102, the user clicks the type column 1104 which provides a drop down menu of the choices available, such as described herein. As can be seen, several transition nodes are assigned different regeneration methods including transform, rerender, reproject, and passthrough, for example. Clicking on the options under "orig" 1110 will cause the rendering of the second eye, e.g., load certain elements to the render queue. Furthermore, one can change the camera assigned to each transition node by clicking on the camera column 1108 and selecting an available camera in a drop down menu. The left right column 1106 allows one to view and edit the left and right eyes. Considerable time is saved through the use of the user interfaces to reuse the composite node graph or composite listing of the first eye to assign regeneration methods to the second eye. Prior techniques included re-doing the compositing listing entirely by hand. Thus, with the user interfaces and the use of transition nodes, what previously would take days, now takes only hours.

According to several embodiments, on the back end of the stereo pipeline, the use of transition nodes enables the shot-finishing artist to generate the second eye with maximum efficiency. On average, given the techniques described herein, one can setup a shot and have elements processing on the render queue in under an hour.

As with most production environments, the final phase of a CG shot pipeline uses a compositing system. Several embodiments take advantage of the fact that the compositing system is node-based, which allows the use of the transition nodes described herein. These transition nodes have many behaviors that simplify the composite graph, define how upstream elements get processed, and determine how the elements get sent to the render farm. The transition node also has the ability to switch between the different rendering methods that we use to generate the second eye's element, including re-projection, re-render, offset, image warp, pass-through, and other techniques.

Layered on top of the transition node system, several embodiments provide a project management interface that simplifies how to set the state of the transition nodes and manages how the elements are regenerated for the second eye. In one embodiment, the transition node instructs the project management interface in how to generate the offset eye's element as well as how to process all elements including the dependency order for the task queuing system. This system also notifies the artist which elements are in need of processing and which elements have been completed. Heavy use of task automation means the artist can focus more time on the creative aspects of a shot.

It is noted that a purist would suggest that re-rendering the shot from the second camera is the most accurate method to produce elements. However, re-rendering is not always the most efficient process to generating the second eye. To improve efficiency, very accurate re-projection systems are provided to duplicate the elements without the need to rerender them. This re-projection system minimizes the number of elements needing processing by pre-compositing whole branches of the composite graph before depth is applied. This process also brings render times down to minutes rather than the multiple hours it usually takes to generate the base elements and allows us to easily incorporate composite tricks such as rotoscoped mattes and other image processing. These additions cannot otherwise be easily mapped into the second eye without producing artifacts.

As discussed herein, an element or a branch of a node graph may be regenerated through re-projection. Re-projection techniques are provided in some embodiments, and are now discussed in more detail. Initially, it is noted that in the embodiments described herein, it is not required that re-projection be a selectable method of element regeneration for the second eye. For example, the user may only be able to select between re-rendering, transforming, etc, but not have the option to re-project.

Generally, in some embodiments, re-projection is a technique used to generate another eye of a 2D image or element without having to re-render it. This results in a significant savings in time and computational resources. In one embodiment, during rendering of the 2D elements for the first eye, for every pixel of the rendered element, the depth into the scene from the perspective of the first eye is recorded. Thus, while the rendering produces a 2D picture of the image, a picture of depth is also taken of the element during rendering. By knowing the depth map of the rendered image, the rendered image can now be reconstructed from the point of view of the second eye. In other words, the depth mapping is used to reconstruct the scene from the point of view of the second eye and then the reconstructed scene is colored with the rendered image. In this way, none of the color is lost. This re-projection results in a considerable savings of time and without the need for geometry data or re-rendering. It would take hours to re-render the original image; however, it takes minutes to re-project it to create the 2D image for the second eye. Thus, in some embodiments, re-projection provides high fidelity images with a minimal amount of information. Re-projection is not always well suited for every element, and thus, some embodiments allows the artist to choose whether to re-render or re-project the 2D element to create the second eye.

Figure 12:
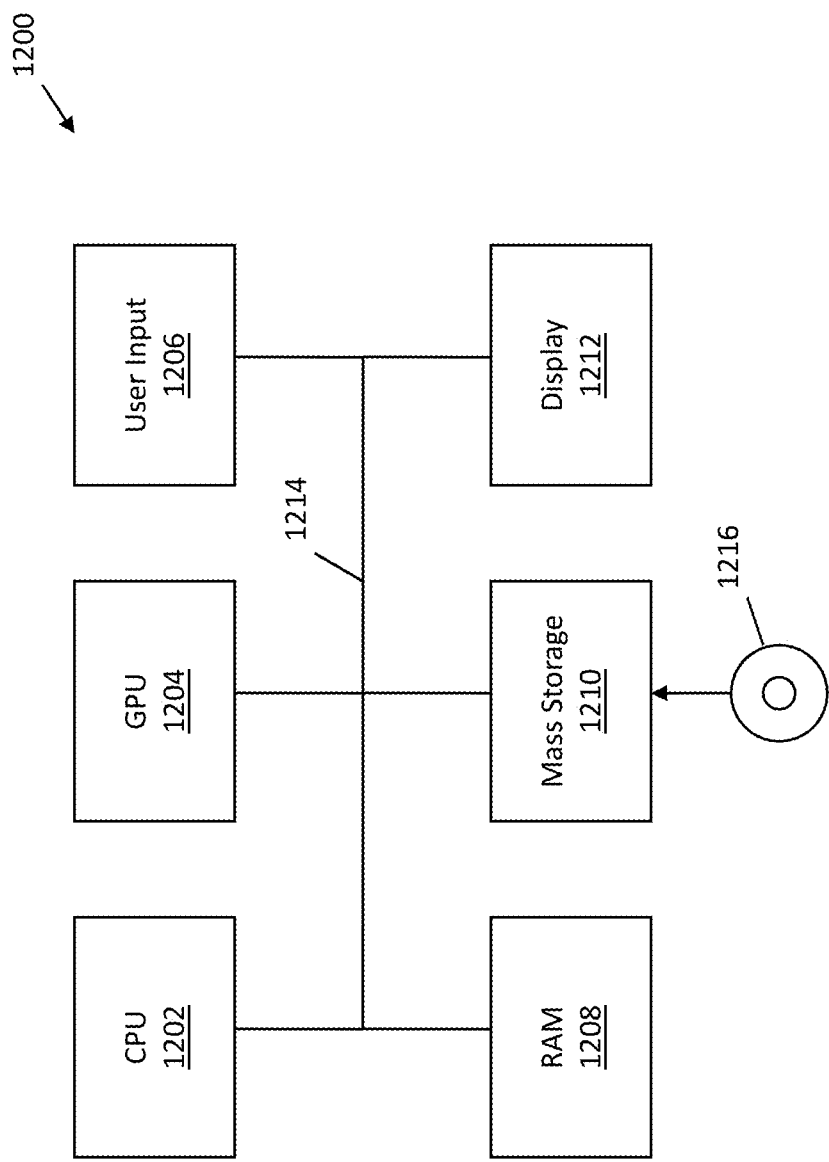
FIG. 12 is a block diagram illustrating a processor based system that may be used to run, implement and/or execute the methods and/or techniques shown and described herein in accordance with embodiments of the invention.

The methods and techniques described herein may be utilized, implemented and/or run on many different types of systems. Referring to FIG. 12, there is illustrated a system 1200 that may be used for any such implementations. One or more components of the system 1200 may be used for implementing any of the methods and applications mentioned above, such as for example any of the above-mentioned methods of generating a second eye of a stereo image. However, the use of the system 1200 or any portion thereof is certainly not required.

By way of example, the system 1200 may comprise a Central Processing Unit (CPU) 1202, a Graphic Processing Unit (GPU) 1204, a Random Access Memory (RAM) 1208, a mass storage 1210, such as a disk drive, and a user interface implemented in a display 1212. The CPU 1202 and/or GPU 1204 may be used to execute or assist in executing the steps of the methods and techniques described herein, and various image content, including 2D images, composite nodes listings and graphs may be displayed on the display 1212 according to several embodiments described in the present application. The system 1200 may further comprise a user input device 1206. The user input device may comprise any user input device such a keyboard, mouse, etc. The system 1200 comprises an example of a device configured to execute the methods and processes described with respect to several embodiments described herein. The various components may be coupled to a bus 1214 which allows communication and signaling between the various components are controlled by the CPU 1202 or the GPU 1204.

The mass storage unit 1210 may include or comprise any type of computer readable storage or recording medium or media. The computer readable storage or recording medium or media may be fixed in the mass storage unit 1210, or the mass storage unit 1210 may optionally include an external memory device 1216, such as a digital video disk (DVD), Blu-ray disc, compact disk (CD), USB storage device, floppy disk, Redundant Array of Independent Disks (RAID) or other media. By way of example, the mass storage unit 1210 may comprise a disk drive, a hard disk drive, flash memory device, USB storage device, Blu-ray disc drive, DVD drive, CD drive, floppy disk drive, RAID disk drive, etc. The mass storage unit 1210 or external memory device 1216 may be used for storing code that implements the methods and techniques described herein.

Thus, external memory device 1216 may optionally be used with the mass storage unit 1210, which may be used for storing code that implements the methods and techniques described herein. However, any of the storage devices, such as the RAM 1208 or mass storage unit 1210, may be used for storing such code. For example, any of such storage devices may serve as a tangible computer storage medium for embodying a computer program for causing a computer or display device to perform the steps of any of the methods, code, and/or techniques described herein.

Furthermore, any of the storage devices, such as the RAM 1208 or mass storage unit 1210, may be used for storing any needed database(s). Furthermore, in some embodiments, the GPU may comprise a graphics card having local graphics memory, wherein the graphics card is employed in executing one or more of the steps of the methods and processes discussed herein.

In some embodiments, one or more of the embodiments, methods, approaches, and/or techniques described above may be implemented in a computer program executable by a processor-based system. By way of example, such processor based system may comprise the processor based system 1200, or a computer, entertainment system, graphics workstation, etc. Such computer program may be used for executing various steps and/or features of the above-described methods and/or techniques. That is, the computer program may be adapted to cause or configure a processor-based system to execute and achieve the functions described above.

As another example, such computer program may be used for implementing any type of tool or similar utility that uses any one or more of the above described embodiments, methods, approaches, and/or techniques. In some embodiments, program code modules, loops, subroutines, etc., within the computer program may be used for executing various steps and/or features of the above-described methods and/or techniques. In some embodiments, the computer program may be stored or embodied on a computer readable storage or recording medium or media, such as any of the computer readable storage or recording medium or media described herein or any computer readable storage or recording medium known to a person of ordinary person skilled in the art.

Therefore, in some embodiments, the invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

While the invention herein disclosed has been described by means of specific embodiments, examples and applications thereof, numerous modifications and variations could be made thereto by those skilled in the art without departing from the scope of the invention set forth in the claims.

What is claimed is:

1. A method for use in 3D movie production comprising:
    displaying a plurality of composite nodes as a composite node graph on a display device to a user, the plurality of composite nodes indicating how to composite a first plurality of rendered 2D elements into an output image, the first plurality of rendered 2D elements and the plurality of composite nodes corresponding to a first eye of a 3D image; and
    receiving, on a processor based system, user input to add one or more transition nodes to the plurality of composite nodes of the composite node graph, each transition node following a respective composite node of the composite node graph and used for regeneration of one or more elements corresponding to the respective composite node, wherein the plurality of composite nodes corresponding to the first eye of the 3D image and the one or more transition nodes are used to direct generation of a second eye of the 3D image,
    wherein, each of the one or more transition nodes indicates how to regenerate at least one of the first plurality of rendered 2D elements corresponding to the first eye of the 3D image to generate at least one of a second plurality of rendered 2D elements corresponding to the second eye of the 3D image; and
    wherein the 3D image comprises the first eye of the 3D image and the second eye of the 3D image.

2. The method of claim 1, wherein the displaying step comprises displaying the plurality of composite nodes to the user as a listing of composite nodes indicating node dependencies, and
    wherein the receiving step comprises receiving user input to add one or more transition nodes to the listing of composite nodes, each transition node following a respective composite node of the listing.

3. The method of claim 1 further comprising:
    receiving instructions from a user for each transition node, the instructions providing a method of the regeneration to be used in the regeneration of the one or more elements corresponding to the respective composite node to generate the second eye of the 3D image; and
    storing the instructions for each of the one or more transition nodes.

4. The method of claim 3 wherein the method of regeneration is selectable from a plurality of regeneration methods, the plurality of the regeneration methods including two or more of re-rendering, re-projecting, image warping, offsetting, transforming, and passthrough.

5. The method of claim 4 wherein in the event a given transition node follows a FileIn node of the plurality of composite nodes, the selectable plurality of regeneration methods includes re-rendering.

6. The method of claim 4 wherein in the event a given transition node does not follow a FileIn node of the plurality of composite nodes, the selectable plurality of regeneration methods do not include re-rendering.

7. The method of claim 4 further comprising:
receiving, in the event re-projection is selected as the method of regeneration for a given transition node, instructions indicating whether one element associated with the given transition node is to be re-projected or whether all elements of upstream composite nodes associated with the given transition node are to be re-projected.

8. The method of claim 3 further comprising:
displaying a listing of the one or more transition nodes in a user interface; and
displaying in the user interface, for each of the one or more transition nodes, the method of regeneration associated therewith, wherein the user interface allows the user to select and alter the method of regeneration associated with a respective transition node.

9. The method of claim 3 further comprising:
outputting information to a rendering process, the information including which of the first plurality of rendered 2D elements corresponding to the first eye of the 3D image are to be re-rendered to generate the second plurality of rendered 2D elements of the second eye of the 3D image.

10. The method of claim 9 further comprising:
outputting information to a regeneration process, the information including which elements corresponding to each composite node are to be regenerated other than by rendering to generate a plurality of other elements of the second eye of the 3D image.

11. The method of claim 10 further comprising:
compositing the second plurality of rendered 2D elements and the plurality of the other regenerated elements as dictated by the plurality of composite nodes and the one or more transition nodes to generate the second eye of the 3D image.

12. The method of claim 10 wherein a given transition node can be added following a FileIn node, a roto node or a branch node.

13. The method of claim 1, wherein the second eye of the 3D image is generated using the composite nodes associated the first eye of the 3D image without the user having to create composite nodes for the second eye of the 3D image.

14. The method of claim 1, wherein the one or more transition nodes are not used to composite the first plurality of rendered 2D elements into the output image corresponding to the first eye of the 3D image.

15. A non-transitory storage medium storing a computer program executable by a processor based system, the computer program causing the processor based system to execute steps comprising:
displaying a plurality of composite nodes as a composite node graph to a user, the plurality of composite nodes indicating how to composite a first plurality of rendered 2D elements into an output image, the first plurality of rendered 2D elements and the composite node graph corresponding a first eye of a 3D image; and
receiving user input to add one or more transition nodes of the composite node graph to the plurality of composite nodes, each transition node following a respective composite node of the composite node graph and used for regeneration of one or more elements corresponding to the respective composite node, wherein the plurality of composite nodes corresponding to the first eye of the 3D image and the one or more transition nodes are used to direct generation of a second eye of the 3D image,
wherein, each of the one or more transition nodes indicates how to regenerate at least one of the first plurality of rendered 2D elements corresponding to the first eve of the 3D image to generate at least one of a second plurality of rendered 2D elements corresponding to the second eve of the 3D image; and
wherein the 3D image comprises the first eye of the 3D image and the second eye of the 3D image.

16. The storage medium of claim 15, wherein the displaying step comprises displaying the plurality of composite nodes to the user as a listing of composite nodes indicating node dependencies, and
wherein the receiving step comprises receiving user input to add one or more transition nodes to the listing of composite nodes, each transition node following a respective composite node of the listing.

17. The storage medium of claim 15 wherein the computer program further causes the processor based system to execute the steps further comprising:
receiving instructions from a user for each transition node, the instructions providing a method of the regeneration to be used in the regeneration of the one or more elements corresponding to the respective composite node to generate the second eye of the 3D image; and
storing the instructions for each of the one or more transition nodes.

18. The storage medium of claim 17 wherein the method of regeneration is selectable from a plurality of regeneration methods, the plurality of the regeneration methods including two or more of re-rendering, re-projecting, image warping, offsetting, transforming, and passthrough.

19. The storage medium of claim 18 wherein in the event a given transition node follows a FileIn node of the plurality of composite nodes, the selectable plurality of regeneration methods includes re-rendering.

20. The storage medium of claim 18 wherein in the event a given transition node does not follow a FileIn node of the plurality of composite nodes, the selectable plurality of regeneration methods do not include re-rendering.

21. The storage medium of claim 18 wherein the computer program further causes the processor based system to execute the steps further comprising:
receiving, in the event re-projection is selected as the method of regeneration for a given transition node, instructions indicating whether one element associated with the given transition node is to be re-projected or whether all elements of upstream composite nodes associated with the given transition node are to be re-projected.

22. The storage medium of claim 17 wherein the computer program further causes the processor based system to execute the steps further comprising:
displaying a listing of the one or more transition nodes in a user interface; and
displaying in the user interface, for each of the one or more transition nodes, the method of regeneration associated therewith, wherein the user interface allows the user to select and alter the method of regeneration associated with a respective transition node.

23. The storage medium of claim 17 wherein the computer program further causes the processor based system to execute the steps further comprising:

outputting information to a rendering process, the information including which of the first plurality of rendered 2D elements corresponding to the first eye of the 3D image are to be re-rendered to generate the second plurality of rendered 2D elements of the second eye of the 3D image.

24. The storage medium of claim 23 wherein the computer program further causes the processor based system to execute the steps further comprising:

outputting information to a regeneration process, the information including which elements corresponding to each composite node are to be regenerated other than by rendering to generate a plurality of other elements of the second eye of the 3D image.

25. The storage medium of claim 24 wherein the computer program further causes the processor based system to execute the steps further comprising:

compositing the second plurality of rendered 2D elements and the plurality of the other regenerated elements as dictated by the plurality of composite nodes and the one or more transition nodes to generate the second eye of the 3D image.

26. The storage medium of claim 24 wherein a given transition node can be added following a FileIn node, a roto node or a branch node.

27. A system for use in 3D movie production comprising:

a processor based system configured to execute a computer program that causes the processor based system to execute steps including:

displaying a plurality of composite nodes as a composite node graph to a user, the plurality of composite nodes indicating how to composite a first plurality of rendered 2D elements into an output image, the first plurality of rendered 2D elements and the composite node graph corresponding a first eye of a 3D image; and receiving user input to add one or more transition nodes to the plurality of composite nodes of the composite node graph, each transition node following a respective composite node of the composite node graph and used for regeneration of one or more elements corresponding to the respective composite node, wherein the plurality of composite nodes corresponding to the first eye of the 3D image and the one or more transition nodes are used to direct generation of a second eye of the 3D image, wherein, each of the one or more transition nodes indicates how to regenerate at least one of the first plurality of rendered 2D elements corresponding to the first eye of the 3D image to generate at least one of a second plurality of rendered 2D elements corresponding to the second eye of the 3D image; and wherein the 3D image comprises the first eye of the 3D image and the second eye of the 3D image.

* * * * *

UNITED STATES PATENT AND TRADEMARK OFFICE
CERTIFICATE OF CORRECTION

PATENT NO. : 8,576,228 B2  Page 1 of 1
APPLICATION NO. : 12/357391
DATED : November 5, 2013
INVENTOR(S) : Davidson et al.

It is certified that error appears in the above-identified patent and that said Letters Patent is hereby corrected as shown below:

In the Claims

Column 16, Line 8, Claim 15, delete "eve" and insert --eye--.

Column 16, Line 11, Claim 15, delete "eve" and insert --eye--.

Column 18, Line 18, Claim 27, delete "image," and insert --image;--.

Signed and Sealed this
Eleventh Day of March, 2014

Michelle K. Lee
*Deputy Director of the United States Patent and Trademark Office*